United States Patent [19]

Hakansson et al.

[11] 4,296,633

[45] Oct. 27, 1981

[54] DEVICE FOR TEMPERATURE MEASUREMENT

[75] Inventors: Hakan B. Hakansson; Lennart P. E. Persson, both of Lund; Berth-Ove G. Wall, Bjäred, all of Sweden

[73] Assignee: Gambro AB, Sweden

[21] Appl. No.: 131,079

[22] PCT Filed: Jul. 3, 1978

[86] PCT No.: PCT/SE78/00012

§ 371 Date: Mar. 3, 1980

§ 102(e) Date: Jun. 1, 1979

[87] PCT Pub. No.: WO80/00191

PCT Pub. Date: Feb. 7, 1980

[51] Int. Cl.³ .................................. G01K 7/22
[52] U.S. Cl. ........................ 73/362 AR; 338/25
[58] Field of Search ............ 73/362 AR; 338/25, 26, 338/28, 30, 254

[56] References Cited

U.S. PATENT DOCUMENTS

| 3,064,222 | 11/1962 | Renier | 73/362 AR X |
| 3,188,594 | 6/1965 | Koller et al. | 73/362 AR X |
| 3,646,494 | 2/1972 | Waseleski, Jr. et al. | 338/25 |
| 3,833,145 | 9/1974 | Crosby et al. | 73/362 AR X |
| 3,872,419 | 3/1975 | Groves et al. | 338/25 |

FOREIGN PATENT DOCUMENTS 2448455 12/1975 Fed. Rep. of Germany .
522660 6/1940 United Kingdom .

Primary Examiner—Gerald Goldberg
Assistant Examiner—Joseph W. Roskos
Attorney, Agent, or Firm—Lerner, David, Littenberg & Samuel

[57] ABSTRACT

The invention relates to a device for temperature measurements, comprising a temperature-sensitive sensor whose electrical properties, e.g. resistance, vary with the temperature, e.g. a thermistor, and which via two contacts is connected to two electric conductors arranged on a support, which electric conductors in turn can be connected to a reading unit for the reading of the actual values of current, voltage or the like corresponding to the temperature.

In a preferred embodiment the said electric conductors are in the form of two metal layers on both sides of a support made of plastics. The one metal layer is interrupted by a gap which is arranged to be bridged by the sensor, one contact of which is connected to each conductor.

21 Claims, 3 Drawing Figures

DEVICE FOR TEMPERATURE MEASUREMENT

TECHNICAL FIELD

The present invention relates to a device for temperature measurement, comprising a temperature-sensitive sensor, whose electrical properties, e.g. the resistance, vary with the temperature, e.g. a thermistor, and which is connected via two contacts to two electric conductors arranged on a support, which electric conductors in turn can be connected to a reading unit for the reading of the actual values of current, voltage or the like corresponding to the temperature.

The invention also relates to a method for the manufacture of a device of the aforementioned type.

The device in accordance with the invention is mainly intended for use in medical temperature measurement. It is desirable therefore to make it simple and cheap so that it can be discarded after application, that is to say, so that it does not have to be re-used.

To those versed in the art it will be clear, however, that the device in accordance with the invention can also be used in different circumstances, e.g. in purely industrial applications, where a simple and inexpensive yet reliable reading of the temperature is required.

BACKGROUND ART

The Swedish patent application 78.03046-7 (U.S. patent application 779,152, filed Mar. 18, 1977) contains a description of different embodiments of a device similar to that according to the invention and how the device according to the invention can be applied. The idea behind the present invention is to produce such a device, but which is of a simpler type and which can be made by a simpler method of manufacture.

In U.S. patent applications 787,422, now U.S. Pat. Nos. 4,200,970, and 879,193, filed Feb. 21, 1978 different trimming procedures for devices similar to that according to the invention are described. It should be possible to apply similar trimming procedures for the trimming of the device in accordance with the invention.

DISCLOSURE OF INVENTION

The device in accordance with the invention is characterized in that the two electric conductors are arranged on both sides of the support which is in the form of an elongated strip and that the one conductor extends directly or via a suitable extension over one edge of the support in the direction towards the other conductor, but without reaching as far as the same, thus forming a gap, slit or the like which is arranged so that it is bridged by the sensor, one contact of which is connected to each conductor.

The abovementioned construction makes possible a very simple method of manufacture which also constitutes an object of the present invention. This method is characterized in that a sheet of an electrically insulating material, e.g. plastics, which is coated with metal on both sides is electrically short-circuited along one edge, that a gap, slit or the like is provided parallel with this edge, that the sheet is cut into strips transversely to the short-circuiting and to the said gap, slit or the like and that a sensor is made to bridge this gap, slit or the like with one contact connected to each metal coating.

The abovementioned support can thus be constituted of a thin strip of plastics or similar electrically insulating material, the said conductors being arranged as thin metal coatings on opposite plane surfaces of the strip and the said gap can thus be provided transversely to the longitudinal direction of the strip in the form of a cut in the one metal coating near one end of the strip.

The short circuiting of the sheet provided metal coatings on either side used as a starting material can be achieved in various ways. It is brought about preferably in that a soldering material or some other similar electrically conducting material is made to surround the edge in contact with both the metal coatings. Alternatively, the one metal coating can be allowed to extend beyond the plastic material in the support and this coating can then be folded around the edge to make contact on the other side.

The sensor used should be provided on one side with two contacts for connection to each conductor. On the opposite side the sensor is appropriately provided with a third contact especially intended for trimming. This trimming may be carried by means of shot peening, laser or some other mechanical or chemical treatment.

The abovementioned gap, slit or the like is appropriately produced by planing, scraping or some other kind of machining.

After the individual devices have been separated by cutting the starting material used into strips transversely to the short-circuiting and to the said gap, slit or the like, the striplike supports obtained can in turn be placed onto somewhat broader strips of a semi-rigid material, e.g. cardboard. The sensor and the connecting contacts are then placed appropriately so that they are located fully within the surface of the broader strip which carries the support. The end of the support remote from the sensor, on the other hand, is appropriately made to project beyond the end of the broader strip so as to facilitate the external connection to the contacts of the electric conductors.

In a preferred embodiment of the subject of the invention the somewhat broader strip consists of cardboard covered on both sides with plastic material, which after the fixing of the support is plastics-coated in such a manner that the sensor, the connecting contacts and at least the nearest part of the electric conductors are covered by means of a plastic layer which in a tight manner enwraps these parts to the somewhat broader strip.

If the device in accordance with the invention is intended for medical usage, it is suitably sterilized and packed in a sterile manner before being delivered to the ultimate user.

BEST MODE OF CARRYING OUT THE INVENTION

Figure 1:
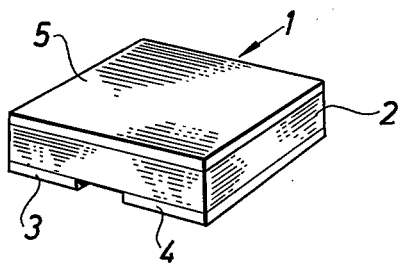
FIG. 1 shows a sensor intended for use in the manufacture of the device in accordance with the invention.
Figure 2:
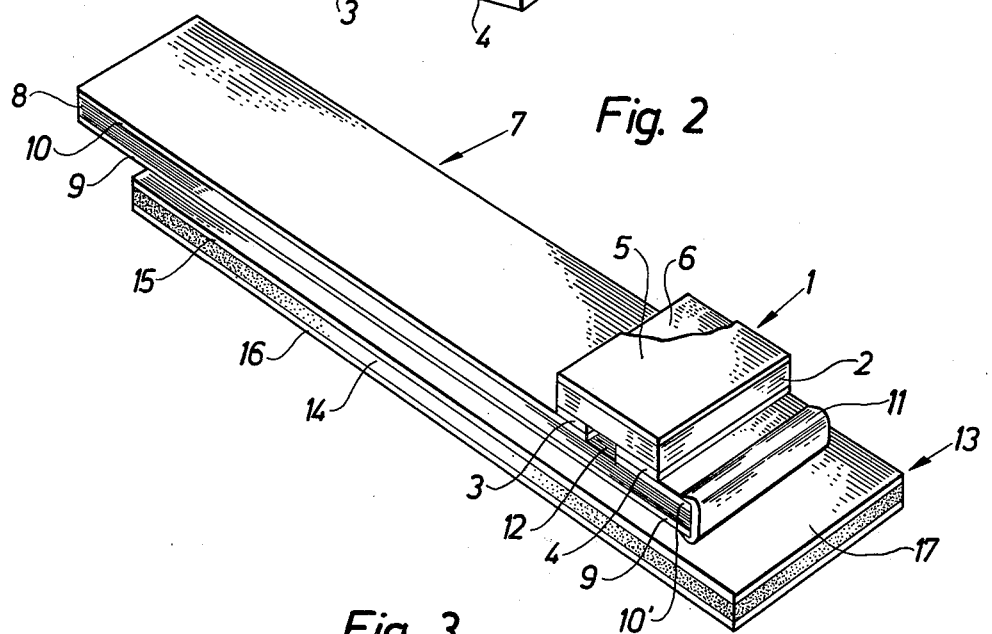
FIG. 2 shows a finished construction in accordance with the invention.

A preferred embodiment of the subject of the invention is shown in FIG. 2. It consists of a sensor 1, which in the example shown is constituted of a thermistor. This thermistor is made up of an inner ceramic material 2, whose electric resistance varies with the temperature. The thermistor is shown in untrimmed condition in FIG. 1. On its underside the thermistor is provided with two contacts 3 and 4 which, for example, may consist of a thin layer of silver. Similarly, the thermistor is provided on its upper side with a silver contact 5 intended for trimming. The trimming may take place so that a small area 6 of the contact 5 is removed by mechanical treatment, e.g. shot peening or with the help of a laser beam. The thermistor is arranged on a support 7 which consists of an inner plastic material 8 with outer metal coatings 9 and 10. These metal coatings may, for example, consist of copper. At its front end, that is to say, the end provided with the sensor 1, the carrier 7 is short-circuited by a soldering 11 in such a manner that the metal coating 9 is in contact with a part 10' of the upper layer 10. This part 10' of the upper metal coating 10 is separated from the rest of this metal coating by a cut 12 which is meant electrically to isolate the two contacts 3 and 4 from one another.

The support 7 with the thermistor 1 described above is placed in turn on a somewhat broader strip 13. This strip 13 may consist of an inner cardboard material 14 with outer plastic coatings 15 and 16. The support 7 is placed so that the thermistor 1 is located fully within the surface 17 of the somewhat broader strip 13 carrying the support 7. The opposite end of the support, on the other hand, is arranged so that it projects beyond the somewhat broader strip 13. The idea behind this is that the part of the whole construction shown to the right in FIG. 2 should be capable of being dipped into an insulating plastic coating, so that the thermistor 1, connecting contacts 3,4 and 5 and at least the nearest part of the electric conductors 9 and 10 are enwrapped in a tight manner to the corresponding end of the somewhat broader strip 13. This plastic wrapping can be made relatively thin by means of a transparent material and is therefore not shown in FIG. 2. The sterile package into which it is intended finally to pack the construction is also not shown.

Figure 3:
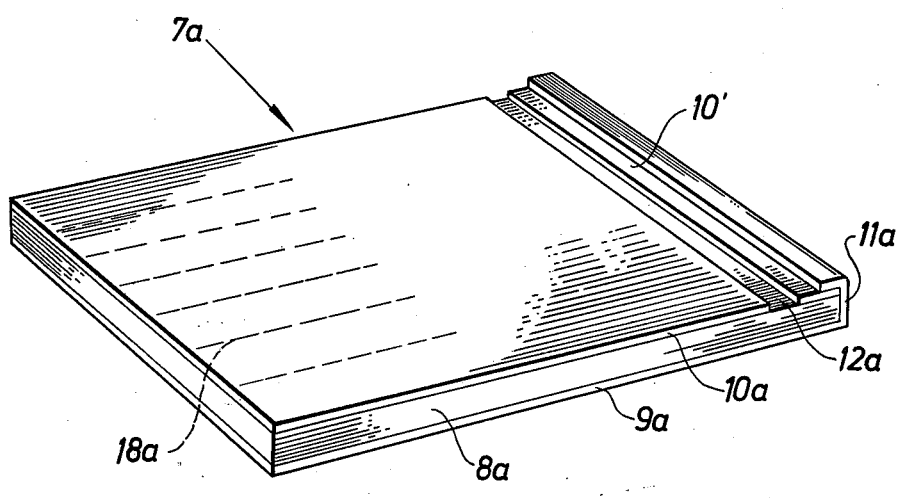
FIG. 3 finally shows a sheet prepared for the manufacture of devices in accordance with the invention.

In FIG. 3 finally a plastic sheet is shown which has been prepared for the manufacture of devices similar to that according to FIG. 2. This plastic sheet consists therefore of an inner plastic layer 8a with outer metal coatings 9a and 10a, the upper metal coating 10a being divided by a cut 12a to form a detached part 10a'. This detached part 10a' is short-circuited with the layer 9a in that the latter is folded around the edge of the sheetlike starting material. Thus the construction differs here from the construction shown in FIG. 2, where instead of the folded over part 11a a soldering 11 is applied. The broken lines 18a indicate how the sheet 7a is to be divided up before or after the placing of thermistors 1 in the manner as shown in detail in FIG. 2.

Alternatively, the part 10a' could be eliminated in the construction according to FIG. 3 in such a way that the gap 12a is formed directly between the coating 10a and the folded over part 11a. No such embodiment has been shown in the drawings, however, since it represents an alternative which is evident to those versed in the art.

Naturally, the invention is not limited merely to the embodiments described above, but, it can be varied within the scope of the following claims. Moreover, as mentioned earlier, its application is not limited merely to the medical field.

The reading of the measured values can take place in various ways, e.g. as described in the aforementioned patent applications. It is done preferably, however, with the help of tongs of the type as shown in the patent application PCT/SE/78/0013, . . . now U.S. Pat. No. 4,253,344, submitted at the same time, reference to the relevant parts of which is made in this matter.

As an alternative to the thermistor 1 a thermocouple may be used, the electromotive force of which varies with the temperature.

We claim:

1. A device for temperature measurement comprising a temperature-sensitive sensor (1), whose electrical properties, e.g. the resistance, vary with the temperature, e.g. a thermistor, and which is connected via two contacts (3, 4) to two electric conductors (9,10) arranged on a support (7), characterized in that the two electric conductors (9,10) are arranged on both sides of the support (7) which is in the form of an elongated strip and that the one conductor (9) extends directly or via a suitable extension (11) over one edge of the support (7) in the direction towards the other conductor (10) but without reaching as far as the same thus forming a gap, slit or the like (12) which is arranged so that it is bridged by the sensor (1) one contact (3,4) of which is connected to each conductor (9,10).

2. A device in accordance with claim 1 where the support (7) is constituted of a thin strip (8) of plastics or similar electrically insulating the said conductors being arranged as thin metal coatings (9,10) on opposite plane surfaces of the strip (8), characterized in that the said gap (12) is provided transversely to the longitudinal direction of the strip (8) in the form of a cut (12) in the one metal coating (10) near one end of the strip (8).

3. A device in accordance with claim 1, where the support (7a) is constituted of a thin strip (8a) of plastics or similar electrically insulating material with the said conductors arranged as thin metal coatings (9a,10a) on opposite plane surfaces of the strip (8a), characterized in that one metal coating (10a) does not reach as far as the one edge of the strip (8a), whilst the other metal coating (9a) overlaps this edge and is folded around the same, the said gap, slit or the like (12a) being formed between the two coatings (9a and 10a) as they do not reach as far as each other.

4. A device in accordance with any one of the preceding claims, characterized in that the sensor (1) is provided with a third contact (5) especially intended for trimming on the side remote from the support which is especially designed for trimming:

5. A device in accordance with claim 1, characterized in that the support (7), which is in the form of an elongated strip, is supported in turn by a somewhat broader strip (13) of a preferably semirigid material such as cardboard or the like.

6. A device in accordance with claim 5, characterized in that the sensor and the connecting contacts (3,4,5) are located fully within the surface (17) of the broader strip (13) which carries the support (7).

7. A device in accordance with claim 5, characterized in that the end of the support (7) opposite the sensor (1) projects beyond the one end of the broader strip (13).

8. A device in accordance with claim 5, characterized in that the somewhat broader strip (13) consists of a cardboard coated on both sides with plastics.

9. A device in accordance with any one of claims 5-8, characterized in that the sensor (1), the connecting contacts (3,4,5) and at least the nearest part of the electric conductors (9,10) are covered by means of a plastic layer which in a tight manner enwraps these parts to the somewhat broader strip (13).

10. A device in accordance with claim 1, characterized in that it is sterilized and packed in a sterile manner and is thus ready for medical use.

11. A temperature-sensitive instrument, comprising:

a temperature-sensitive sensor having electric properties which vary with temperature and having first and second electric contacts;

a support member including first and second electric conductors disposed on at least two surfaces of said support member for connection to a reading unit for reading values corresponding to temperature;

a gap on said support member between said first and second electric conductors; and said sensor bridging said gap with said first contact connected to said first conductor and with said second contact connected to said second conductor.

12. A temperature-sensitive instrument in accordance with claim 11, wherein said support member includes opposite planar surfaces, and said first and second conductors are arranged on said opposite planar surfaces, respectively.

13. A temperature-sensitive instrument in accordance with claim 12, wherein said support member is an elongated strip formed of insulating material and is covered with metal to form said first and second conductors.

14. A temperature-sensitive instrument in accordance with claim 11, wherein said support member is an elongated strip, and said gap extends in a transverse direction to the longitudinal axis of said elongated strip.

15. A temperature-sensitive instrument in accordance with claim 14, wherein said gap is a cutout formed in one of said first and second conductors adjacent one end of said elongated strip.

16. A temperature-sensitive instrument in accordance with claim 12, wherein said first conductor is shorter than said support member, and said second conductor extends around the edge of said support member and terminates at a point spaced from said first conductor to form said gap.

17. A temperature-sensitive instrument in accordance with claim 11, wherein said temperature-sensitive sensor includes a third contact for trimming to change the electric property of said sensor.

18. A temperature-sensitive instrument in accordance with claim 11, wherein said support member is supported by a second support member of semirigid material.

19. A temperature-sensitive instrument in accordance with claim 11, wherein said temperature-sensitive sensor is a thermistor, and wherein said first and second electric contacts are positioned at spaced-apart points on one surface of said thermistor.

20. A temperature-sensitive instrument in accordance with claim 11, wherein said support member is formed of plastic insulating material having thin metal coatings deposited thereon to form said first and second electric conductors.

21. A temperature-sensitive instrument in accordance with claim 18, wherein said second support member is formed of cardboard material and is coated on opposite sides thereof with plastic material.

* * * * *

UNITED STATES PATENT AND TRADEMARK OFFICE
CERTIFICATE OF CORRECTION

PATENT NO. : 4,296,633

DATED : October 27, 1981

INVENTOR(S) : Hakan B. Hakansson, Lennart P.E. Persson, Berth-Ove G. Wall

It is certified that error appears in the above-identified patent and that said Letters Patent are hereby corrected as shown below:

Column 3, line 67, "4,253,344" should read --4,253,334--.

Signed and Sealed this

Seventeenth Day of July 1984

[SEAL]

Attest:

GERALD J. MOSSINGHOFF

Attesting Officer

Commissioner of Patents and Trademarks